No. 776,681. PATENTED DEC. 6, 1904.
R. C. PARSONS, R. BELFIELD & W. CHAPMAN.
ELECTRIC RAILWAY.
APPLICATION FILED NOV. 16, 1900.
NO MODEL. 4 SHEETS—SHEET 1.
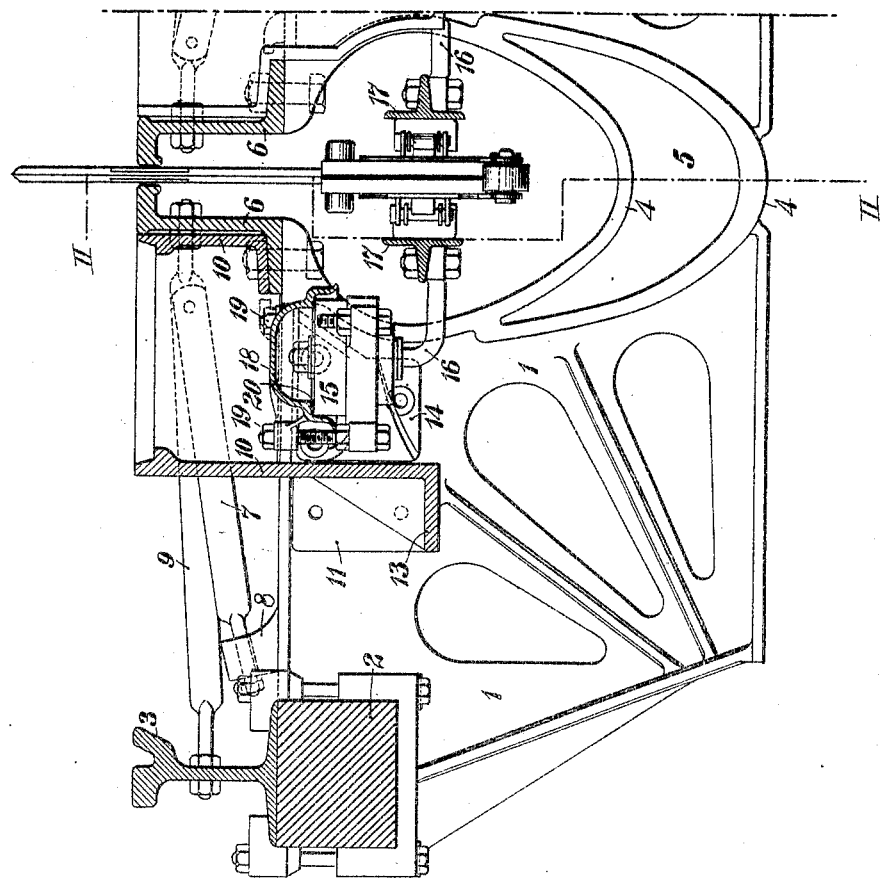
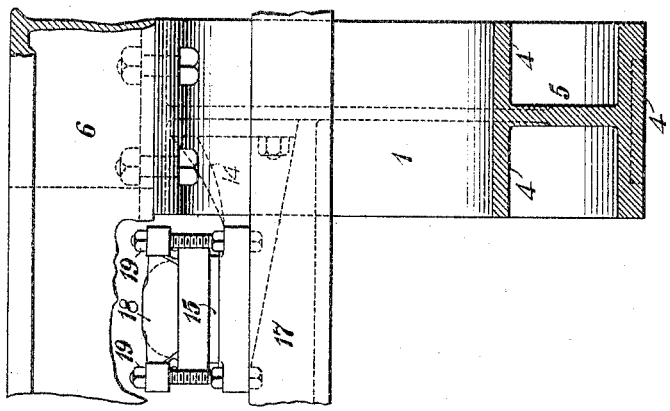
WITNESSES:
C. L. Belcher
Birney Hines
INVENTORS
Richard Clere Parsons
Reginald Belfield
William Chapman
BY
Wesley G. Carr
ATTORNEY.

No. 776,681. PATENTED DEC. 6, 1904.
R. C. PARSONS, R. BELFIELD & W. CHAPMAN.
ELECTRIC RAILWAY.
APPLICATION FILED NOV. 16, 1900.
NO MODEL. 4 SHEETS—SHEET 2.
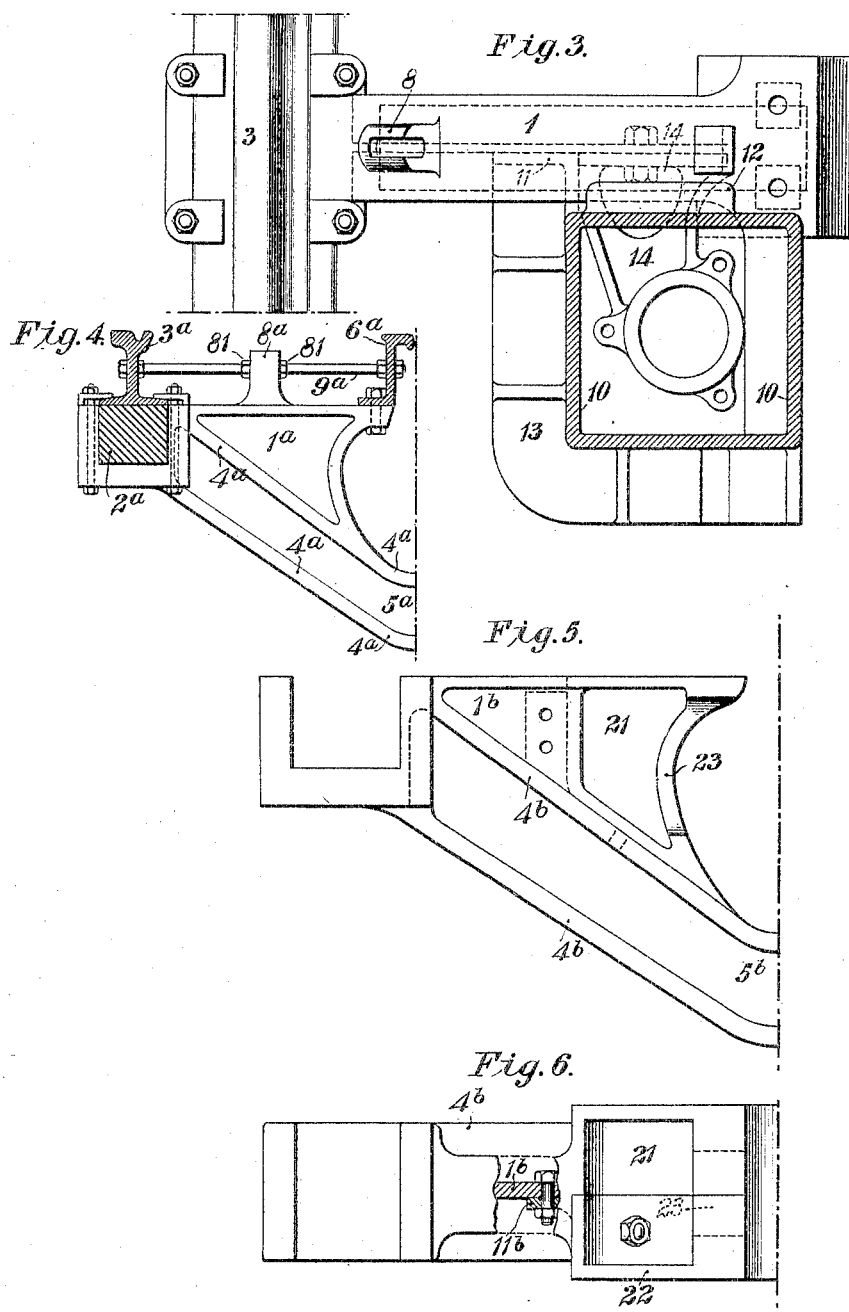

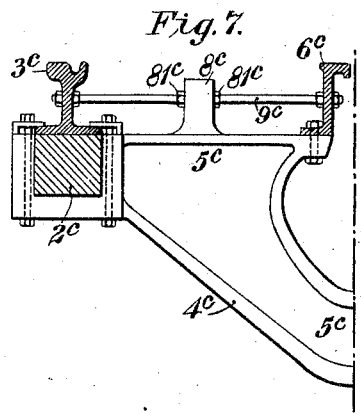
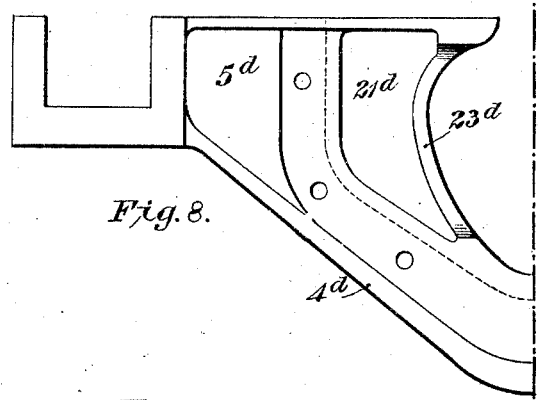
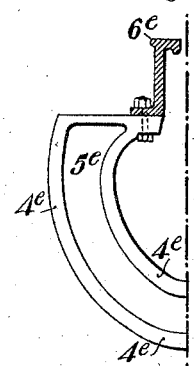
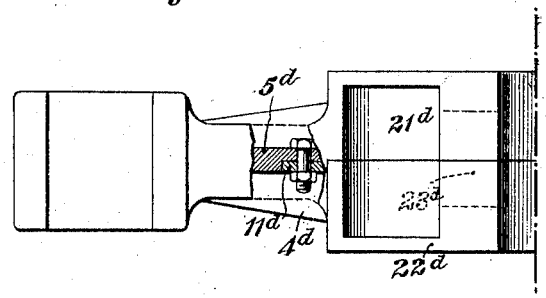
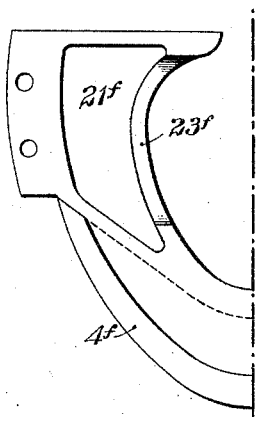
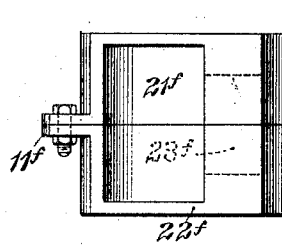
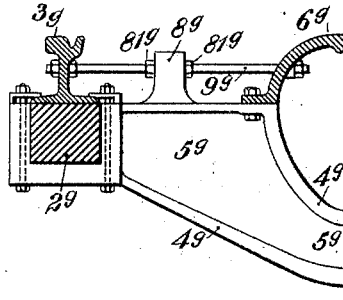
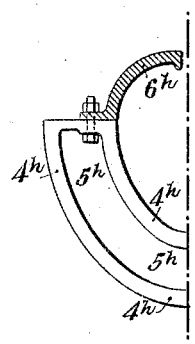

No. 776,681. PATENTED DEC. 6, 1904.
R. C. PARSONS, R. BELFIELD & W. CHAPMAN.
ELECTRIC RAILWAY.
APPLICATION FILED NOV. 16, 1900.
NO MODEL. 4 SHEETS—SHEET 4.
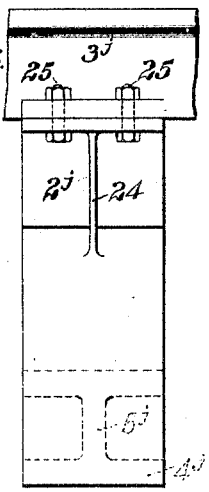
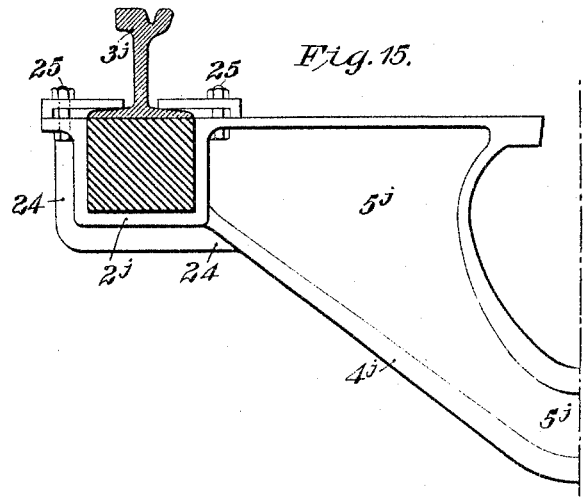
WITNESSES:
INVENTORS
Richard Clere Parsons
Reginald Belfield
William Chapman
BY
ATTORNEY.

No. 776,681.

Patented December 6, 1904.

UNITED STATES PATENT OFFICE.

RICHARD CLERE PARSONS, REGINALD BELFIELD, AND WILLIAM CHAPMAN, OF LONDON, ENGLAND, ASSIGNORS TO WESTINGHOUSE ELECTRIC & MANUFACTURING COMPANY, OF PITTSBURG, PENNSYLVANIA, A CORPORATION OF PENNSYLVANIA.

ELECTRIC RAILWAY.

SPECIFICATION forming part of Letters Patent No. 776,681, dated December 6, 1904.

Application filed November 16, 1900. Serial No. 36,695. (No model.)

*To all whom it may concern:*

Be it known that we, RICHARD CLERE PARSONS, director, REGINALD BELFIELD, electrician, and WILLIAM CHAPMAN, electrical engineer, subjects of the Queen of Great Britain, residing at London, England, have invented a new and useful Improvement in Electric Railways, of which the following is a specification.

This invention relates to electric railways of the class in which the current is supplied by means of conductors located in slotted conduits; and it has for its object to improve the construction of such conduits and the parts immediately connected with and related thereto.

In electric railways of the class to which the invention relates the conduit is usually provided with yokes which are located at intervals transversely and vertically in the road-bed, and there is a considerable tendency for the yokes to bend in the middle under the conduit by reason of the pressure exerted by the swelling of the road-bed, this being obviously the part having the least vertical depth. Such bending of the yoke has the effect of reducing the width of the slot, and this sometimes causes the plow or part which projects through the slot to convey current from the main to be seized or bound in the slot, thereby impeding the movement of the car. According to the present invention in order to overcome this difficulty projecting ribs are provided, which are cast or otherwise formed integral with the yoke, preferably on each side thereof, surrounding the lower portion of the conduit. In order to further guard against the partial closure of the slot by the approach toward each other of the sides thereof, usually termed "slot-rails," said slot-rails are connected not only, as heretofore, direct to the rails on which the car runs, but also to projections formed on the yoke itself.

The invention furthermore comprises an improved means of supporting and insulating the conductor or conductors within the conduit, all of which will be clearly understood from the following description.

In the accompanying drawings, Figure 1 is a portion of an end elevation, showing our improved construction of yoke and other parts connected therewith. Fig. 2 is a section on line II II of Fig. 1. Fig. 3 is a half-plan of the yoke and its appurtenances, the slot-rails being removed. Fig. 4 is a half-elevation illustrating a modified form of yoke. Fig. 5 is a half-elevation of another modification, and Fig. 6 is a half-plan showing in addition the complete box or receptacle provided for containing means for supporting the conductor-rail. Figs. 7, 8, and 9 are views similar to Figs. 4, 5, and 6, respectively, showing another modification. Figs. 10, 11, and 12 are views similar to Figs. 4, 5, and 6, respectively, showing another modification in which the yoke is not intended to directly support the car-rails. Figs. 13 and 14 are half-elevations showing a construction of yoke for use where the depth of the road-bed is comparatively small. Fig. 15 is a half-elevation, and Fig. 16 a side elevation, of a yoke provided with an improved form of trough for receiving the stringers.

Referring now more particularly to Figs. 1, 2, and 3, the yoke 1, which carries the stringers or longitudinal sleepers 2 for supporting the car-rails 3, is provided with projecting ribs 4 on each side at that part which surrounds the lower portion of the conduit. These projections, with the web 5, form practically a curved I-beam, which very materially stiffens the yoke at its weakest part—namely, at the center—without unduly increasing the weight or expense of manufacture. The slot-rails are indicated at 6 and are firmly bolted to the yoke, being also connected by tie-rods 7 to projections 8 on the yoke, as well as by tie-rods 9, to the webs of the car-rails 3, the double connection bracing the entire structure in a very substantial manner. At suitable intervals adjacent to the yokes pockets or recesses are formed in the side of the conduit, which pockets communicate with a box-like receptacle, (shown at 10.) These boxes, which are furnished with suitable covers flush with the road-surface, are bolted to the yoke through vertical flanges 11 and are provided with horizontal flanges 12, (see Fig. 3,) which rest on the top of the yoke. Lower horizontal flanges 13 rest upon the concrete bed in which the yoke is laid. Provision is made for attaching these boxes on each side of the yoke and on either side of the conduit, as may be necessary. Within each box is a bracket 14, bolted to the yoke and supporting in a circular aperture an insulator 15, to which is secured the vertical limb of an L-shaped piece 16, that carries at its lower extremity the conductor 17. The insulator 15 is held in position, and its top is covered by a cap 18, secured by three bolts 19, a packing-ring 20 being preferably provided between the rim of the cap and the insulator in order to prevent entrance of moisture. By this method of supporting the conductor very high insulation may be secured, and at the same time the insulator and all parts are readily accessible. In some cases the bracket 14 is replaced by a shelf supported on ledges provided in the box 10. The bracket or shelf when the latter is used can very readily be removed, if necessary, thereby affording a means of communication with the interior of the conduit in addition to the usual manholes. The boxes may also be cast integral with the yoke. Where two conductors are provided in the conduit—as indicated in Fig. 1, for example—recesses or pockets with the suspending means are provided on each side. These recesses, with the boxes, may be located on the same side of the yoke, as shown in Fig. 1, or on opposite sides of the yoke, and as many of these are provided as is necessary under the circumstances. Where the conductors are in sections placed end to end and insulated from each other, the ends of adjacent sections are arranged to occur at a yoke, so that by means of suspending devices located on each side of the yoke the extremities of the sections are suitably supported.

Referring now to Fig. 4, the yoke therein illustrated is much lighter than the form of yoke shown in Fig. 1, although it has approximately the same strength. The ribs $4^a$ $4^a$ are prolonged upward to meet the part of the yoke which receives the stringer $2^a$, or where stringers are not employed said ribs are continued to the top of the yoke and the slot-rail $6^a$ is connected to the rail $3^a$ by a tie-rod $9^a$, which passes through the projection $8^a$ of the yoke, nuts 81 being screwed on the tie-rod on each side of the said projection. By this arrangement the single rod $9^a$ serves a double purpose of connecting the slot-rail to the yoke as well as to the rail $3^a$.

In Figs. 5 and 6 a yoke of a form somewhat similar to that shown in Fig. 4 is illustrated; but it is constructed in such a manner that the receptacle for receiving the support for the insulators is formed centrally in the yoke. For this purpose the web $1^b$ instead of being plane is so constructed at the part 21 as to form one half of the receptacle, a special angle-piece 22 (shown in plan in Fig. 6) forming the other half of the receptacle and being bolted by its flange $11^b$ to the web $1^b$ of the yoke. It will be seen, therefore, that the receptacle instead of being located at one side of the yoke is located approximately centrally with reference thereto, and the necessity for forming special pockets or recesses in the side of the conduit is avoided. The receptacle opens into the conduit at the part 23, through which opening the lower portion of the arm carrying the conductor-rails will project.

Fig. 7 illustrates a yoke similar in design to Fig. 4, the middle portion of the rib $4^a$ in that figure being omitted.

Figs. 8 and 9 show the yoke having the same relation to that shown in Fig. 7 as the yoke shown in Figs. 5 and 6 bears to that shown in Fig. 4. The general features are the same; but the box-like receptacle will be somewhat deeper, owing to the fact that the flange $11^d$ of the box is extended downward to rest on the bottom flange $4^d$ of the yoke instead of on the middle flange, which in this case is non-existent.

In Fig. 10 a narrow form of yoke is illustrated, in which, however, the same general feature of projecting ribs $4^e$ is found. Yokes of this pattern are necessarily employed where considerations of space prevent the use of a yoke the full width of the track. Figs. 11 and 12 illustrate a narrow yoke of this description in which the upper portion of the yoke takes the form of one-half of a box-like receptacle, as previously described with reference to Figs. 5 and 6 and 8 and 9. In this case, as will be readily seen from the figures, the upper portion of the yoke $21^f$ is substantially the same shape as the half of the box of the receptacle $22^f$, which is secured thereto. The construction will be readily understood from the drawings and requires no further description here.

At some parts of the road—for example, where the track passes over a bridge—it may be desirable to reduce the vertical depth of the conduit, and yokes suitable for laying such shallow conduits are illustrated in Figs. 13 and 14, that shown in Fig. 13 being a modification of the yoke shown in Fig. 7 and that shown in Fig. 14 being a modification of the yoke shown in Fig. 10. The slot-rails $6^g$ $6^h$ in these constructions form the upper portion of the conduit. Consequently the webs of such rails are curved, as illustrated, instead of being straight, as in the ordinary constructions.

Figs. 15 and 16 illustrate a yoke similar to that shown in Fig. 7; but the trough $2^j$, which receives the stringer for supporting the rail 3ʲ, is made much thinner, being strengthened by a projecting rib 24. By this means not only is the device made lighter, but the necessity for drilling long holes for the reception of the bolts 25 for holding the rails in position is avoided.

We claim as our invention—

1. In an electric railway, the combination with a conduit and a yoke constituting an integral part thereof, of a box-like structure bolted to the yoke, a bracket secured to the yoke, an insulator supported by said bracket, a stem passing through said insulator and secured to the top thereof by a nut and projecting downward and into the conduit for supporting the conductor-rail therein, and a cap inclosing the top of the insulator for maintaining the insulation between said nut and the supporting-bracket, substantially as described.

2. In an electric railway having a slotted conduit, the combination with a yoke having projections, of slot-rails secured to said yoke, tie-rods connecting said slot-rails with the car-rails, and tie-rods connecting the slot-rails with the yoke projections.

3. The combination with a yoke for electric-railway conduits, of slot-rails bolted to said yoke, and tie-rods connected to the yoke and to the car-rails, having common connections with the slot-rails.

4. The combination with a yoke for electric-railway conduits having projections, of slot-rails bolted to said yoke, and tie-rods connecting said slot-rails to the car-rails and also to the projections on the yoke.

In testimony whereof we have hereunto set our hands this 31st day of October, 1900.

RICHARD CLERE PARSONS.
REGINALD BELFIELD.
WILLIAM CHAPMAN.

Witnesses to the signatures of Richard Clere Parsons and Reginald Belfield:
CHARLOTTE JULIA WOOD,
CYRIL COTTON.

Witnesses to the signature of William Chapman:
MAX HALDER,
ALEXANDRE HATCH.